United States Patent [19]

Tay

[11] 3,958,018

[45] May 18, 1976

[54] PROCESS FOR MANUFACTURING CONFECTIONS

[75] Inventor: Eugenia Tay, New York, N.Y.

[73] Assignee: Magic Chocolate, Inc., Danbury, Conn.

[22] Filed: Dec. 9, 1974

[21] Appl. No.: 530,863

[52] U.S. Cl.............................. 426/103; 426/104; 426/306; 426/307; 426/660
[51] Int. Cl.$^2$.......................................... A23G 3/00
[58] Field of Search ............ 426/306, 307, 660, 89, 426/103, 104

[56] References Cited
UNITED STATES PATENTS

| | | | |
|---|---|---|---|
| 1,414,528 | 5/1922 | Scott.................................. | 426/306 |
| 1,473,289 | 11/1923 | Green................................. | 426/306 |
| 1,524,636 | 1/1925 | Bausman............................ | 426/306 |
| 1,725,608 | 8/1929 | Zebulske............................ | 426/306 |

Primary Examiner—Jeanette M. Hunter
Attorney, Agent, or Firm—Brumbaugh, Graves, Donohue & Raymond

[57] ABSTRACT

Apparatus for manufacturing confections includes a moving endless belt defining a surface onto which a hardenable, liquid confectionary material, such as molten sugar, is distributed. The molten sugar is first dispensed in strands extending longitudinally of the moving belt by a device that includes a hopper with a plurality of distribution openings formed in its bottom. A second, similar dispensing device dispenses molten sugar onto the moving belt in strands that extend transversely of the belt. Together the longitudinal and transverse strands cool to form a continuous, self-supporting matrix or core having a random openwork pattern. The sugar matrix is cut and then transferred, on a short transfer conveyor, for example, from the first endless belt to a second endless belt that has a mesh surface. The mesh belt transports the sugar matrix underneath a trough extending transversely of the belt and disposed above the belt. The trough distributes a second hardenable, liquid confectionary material, such as molten chocolate, over the sugar on the belt to coat the sugar. Thereafter, the sugar passes underneath a plenum chamber that leads from a blower and directs a flow of air downwardly over the coated sugar. The flow of air removes molten chocolate from and reopens most of the interstices of the openwork pattern formed by the distributed sugar. The distributed sugar and the chocolate coating are then allowed to cool and harden into a finished confection having a delicate, lace-like appearance.

6 Claims, 8 Drawing Figures

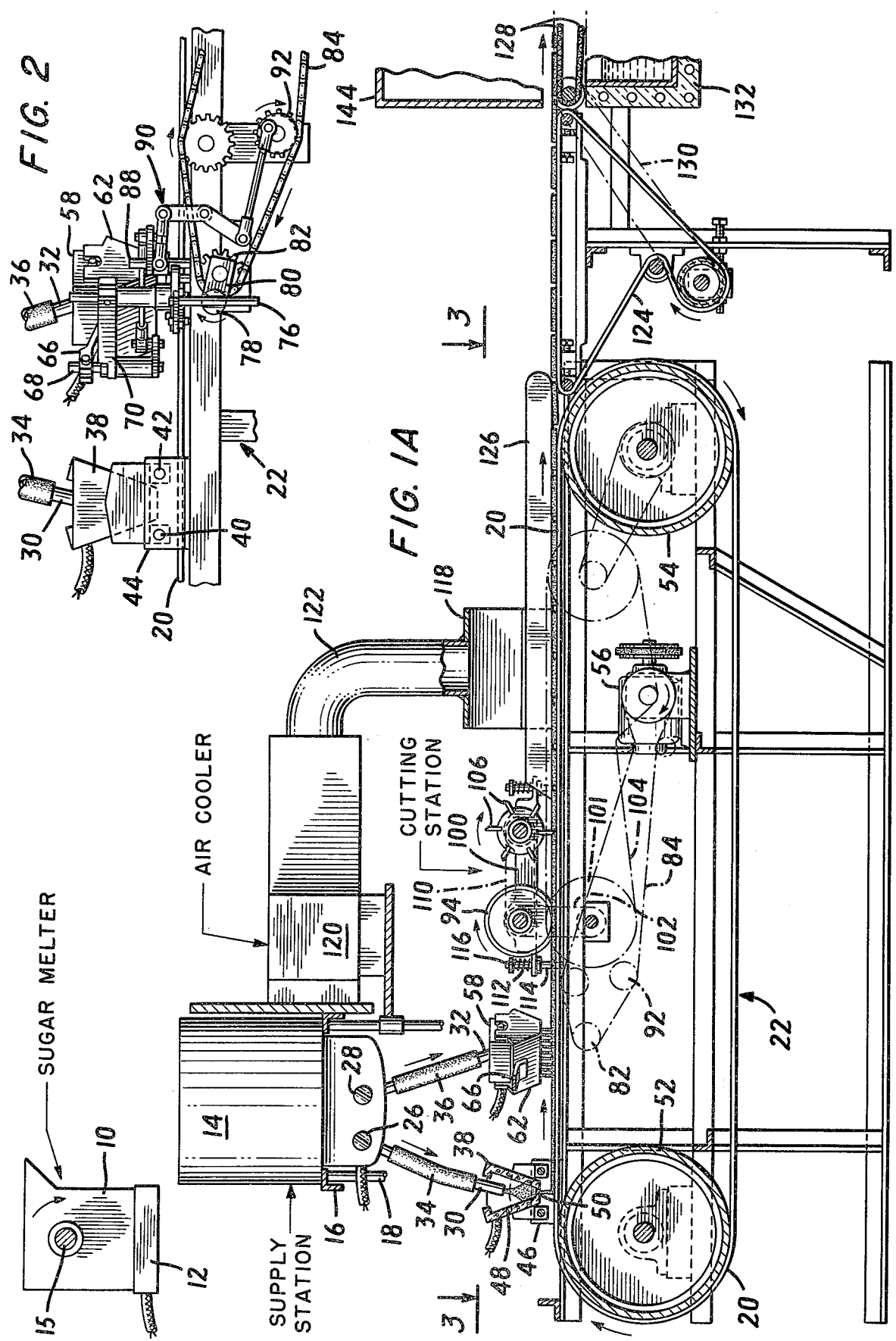

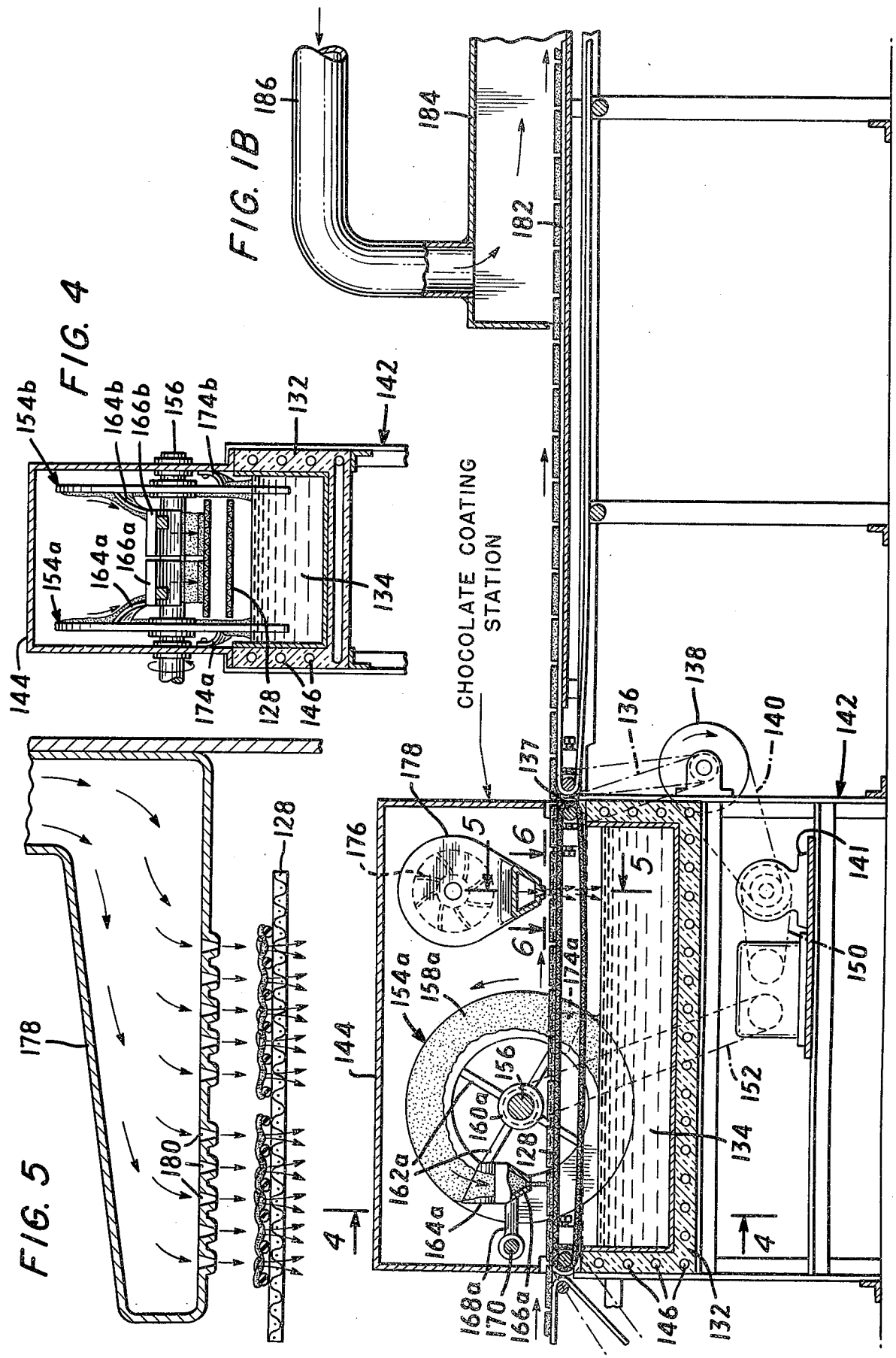

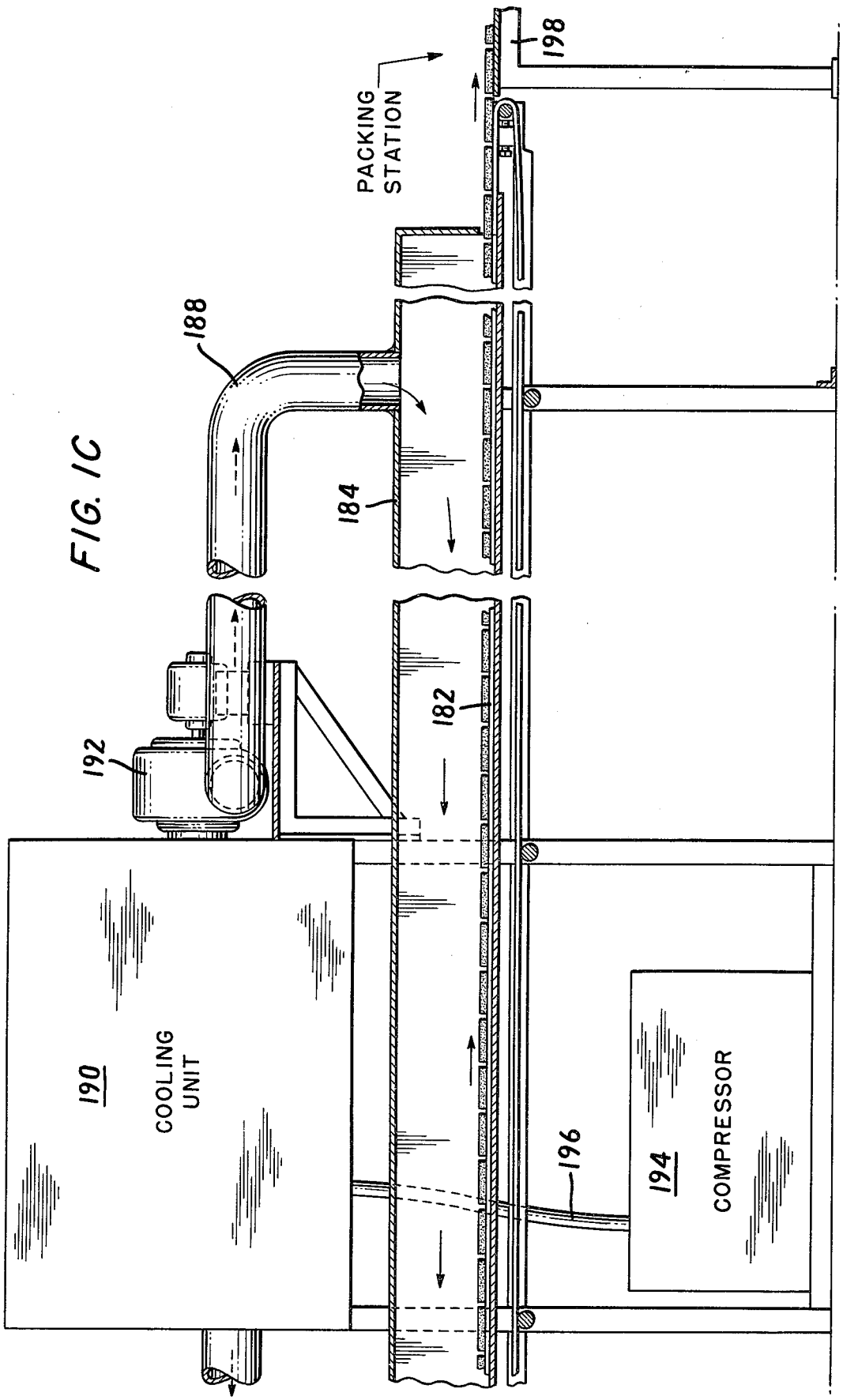

PROCESS FOR MANUFACTURING CONFECTIONS

BACKGROUND OF THE INVENTION

Confections, particularly candy bars, are typically manufactured by forming a solid central core of a confectionary substance, such as nuts, coconut or some other granular, edible material embedded in a matrix of a second edible material, and then coating the central core with a thin layer of chocolate. The chocolate coating operation can be conveniently accomplished by placing the core of the confection on a moving endless belt and pouring molten chocolate over the core as it passes underneath a suitable dispenser.

The solid central core of a typical chocolate coated confection can be inexpensively made with automated equipment long known in the confection field. Confections having a more intricate shape, however, such as an openwork or lace-like pattern, are rare and are conventionally made by hand in relatively small quantities. Moreover, manually produced openwork matrices cannot be satisfactorily coated with chocolate using conventional machinery since the process would tend to fill in the interstices of the openwork structure and thereby diminish the aesthetically pleasing openwork appearance desired for the finished confection.

SUMMARY OF THE INVENTION

The present invention is directed to a process and apparatus for manufacturing a coated confection that has a core formed in a lacy, openwork pattern and is coated without permanently filling the interstices of the core. The apparatus of the invention includes a movable surface, such as is defined by an endless moving belt, and a reservoir containing a quantity of a hardenable, liquid material, such as molten sugar, that is to be distributed onto the moving belt. A dispensing device communicates with the reservoir and has a plurality of distinct distribution openings. The dispensing device can be maintained in a fixed transverse position relative to the moving belt so that the molten sugar from the reservoir is dispensed onto the belt from the distribution openings in a plurality of fine strands extending longitudinally of the belt. A second dispensing device also communicates with the reservoir and has a plurality of distinct distribution openings. The second dispensing device is movable transversely of the moving belt so that molten sugar is dispensed onto the belt in a pluarality of fine strands extending transversely of the belt. Together, the longitudinal and transverse strands of the distributed molten sugar cool to define a self-supporting confectionary core having a lacy, openwork pattern.

The core of sugar distributed onto the moving belt is cut into convenient size segments and then transferred, by an intermediate transfer belt, for example, to a movable mesh surface, e.g., a moving, endless mesh belt, that transports the sugar core under a device for distributing a second hardenable, liquid material, such as molten chocolate, over the core. The coated core of sugar is then carried by the moving mesh belt underneath an apparatus that directs a flow of air downwardly over the sugar core and the molten chocolate covering the core. The flow of air removes excess molten chocolate from the core generally and more specifically removes chocolate that has bridged the interstices of the sugar core to maintain the openwork pattern of the core in the finished product. Thereafter, the coated confection is allowed to cool and harden on another belt.

In a preferred embodiment of the apparatus, both devices for dispensing the molten sugar include a hopper having a plurality of distribution openings formed in its bottom and a conduit coupled to the reservoir and extending to the top of the hopper for delivering molten sugar from the reservoir to the hopper. Both dispensing devices also include heating elements to maintain the sugar in the hoppers molten while it is being dispensed onto the moving belt. A drive system automatically moves the hopper of the transversely movable dispensing device across the surface of the moving endless belt.

Disposed between the second dispensing device and the apparatus for applying the coating of molten chocolate to the sugar core is a mechanism for cutting the core material into distinct pieces. The cutting mechanism includes blades disposed transversely of the moving belt that sever distinct pieces of the core from the continuous openwork ribbon of sugar distributed by the two dispensing devices. The cutting mechanism also includes a blade or blades disposed parallel to the moving belt and intermediate its side edges for splitting the sugar core lengthwise.

The coating apparatus includes a reservoir containing the molten chocolate and positioned underneath the moving mesh belt. The reservoir has an open top so that it communicates with the underside of the mesh belt to catch any molten chocolate dripping from the belt. Positioned alongside the mesh belt and disposed so that its lower portion is in the reservoir and its upper portion is above the mesh belt is at least one rotatable member. The rotatable member defines a surface to which the molten chocolate can adhere as the surface passes through the reservoir. The chocolate covered surface can then move upwardly from the reservoir above the mesh surface toward a flexible scraper that scrapes the molten chocolate from the surface and directs the chocolate into at least one trough member. The trough member extends transversely of the mesh belt and is disposed above the belt. A distribution slot in the bottom of the trough member also extends transversely of the mesh belt. Accordingly, the molten chocolate directed into the trough member by the flexible scraper passes through the distribution slot and is distributed over the pieces of sugar core moving underneath the trough member on the mesh belt.

Downstream, in the direction of movement of the sugar core, from the trough member is the apparatus for directing the flow of air over the coated pieces of sugar core. The air flow directing apparatus includes a blower for producing the flow of air and a plenum chamber coupled to the exhaust of the blower. The plenum chamber extends transversely of and above the mesh belt and includes at least one opening to direct the air flow from the blower downward over the coated sugar core. Molten chocolate that would normally bridge or fill the interstices of the core is thereby blown out of the interstices and through the mesh belt so as to reopen a substantial proportion of them. The molten chocolate may also be blown, at least to some extent, around the undersides of the strands of the sugar core to effect a more uniform coating of the strands and excess chocolate, generally, is returned to the reservoir.

After passing under the plenum chamber, the pieces of coated core are transferred onto an endless moving belt that transports the coated pieces through a cooling station. The cooling station comprises a hood over the endless belt, through which air is forced from a cooling unit to cool and harden both the chocolate coating and the sugar core. At the end of the cooling station, the pieces of coated core are removed from the endless belt and packed for shipment and sale.

BRIEF DESCRIPTION OF THE DRAWINGS

For a better understanding of the invention, reference may be made to the following description of an exemplary embodiment, taken in conjunction with the figures of the accompanying drawings, in which:

FIG. 1A is a side sectional view of one end of apparatus for manufacturing confections, according to the invention;

FIG. 1B is a side sectional view of an intermediate portion of the apparatus of FIG. 1A;

FIG. 1C is a side sectional view of the other end of the apparatus of FIG. 1A;

FIG. 2 is an enlarged side view of a portion of the apparatus illustrated in FIG. 1A;

FIG. 4 is a sectional view taken along view line 4—4 of FIG. 1B;

FIG. 5 is a sectional view taken along view line 5—5 of FIG. 1B; and

DESCRIPTION OF AN EMBODIMENT

Figures 3, 6:
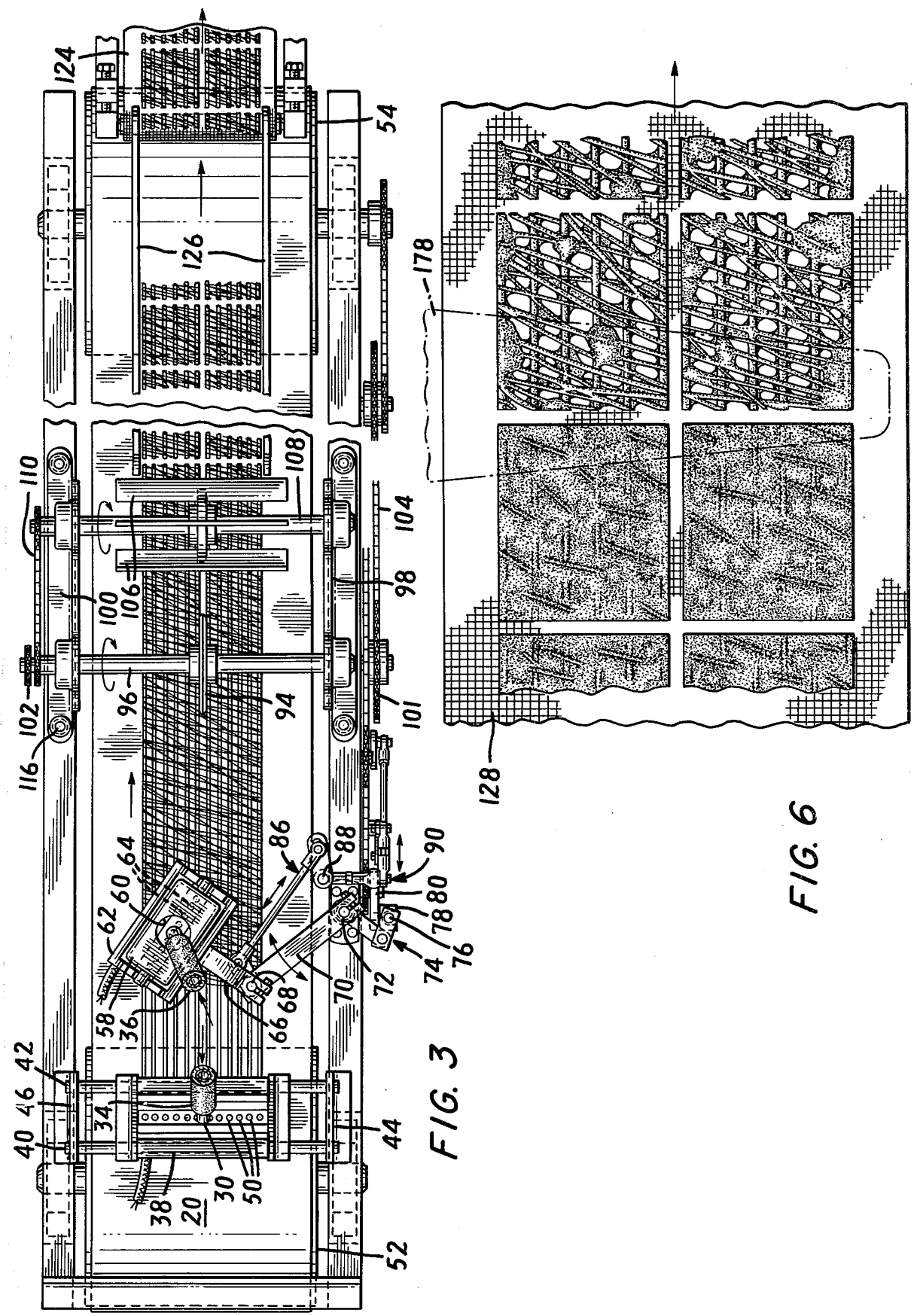
FIG. 3 is a plan view taken along view lines 3—3 of FIG. 1A.
FIG. 6 is a plan view taken along view line 6—6 of FIG. 1B.

FIGS. 1A, 1B, and 1C of the drawings, when arranged in succession, present a longitudinal sectional view of apparatus for manufacturing confections according to the invention. The confection being manufactured includes a core material, which may be formed substantially of sugar, covered with a coating, such as chocolate. As can best be seen in FIG. 3, the core material is composed of longitudinal and transverse strands preferably arranged in a random openwork pattern having a plurality of interstices. The aesthetically pleasing effect of the openwork pattern is maintained even after coating the core material by removing excess chocolate from substantially all of the interstices, as shown in FIG. 6. If desired, of course, the transverse strands may be disposed so as to create a regular, rather than a random, pattern.

Beginning at the left hand side of FIG. 1A, the apparatus includes a tiltable container 10 in which sugar is melted using an electrical heating element 12 positioned in the base of the container 10. The container 10 is preferably a double boiler and the liquid between the two parts of the double boiler is preferably mineral oil. The melting of the sugar in the container 10 is basically a batch operation in which a quantity of granular sugar is placed in the container and the container is heated to melt the sugar. The molten sugar is emptied into a reservoir 14 by tilting the container 10 about its supporting shaft 15 so that the sugar flows out of the spout of the container. Other arrangements and apparatus for melting the sugar may be used so long as sufficient quantities of molten sugar are supplied to the reservoir 14 to sustain continuous operation of the distributing apparatus described hereinafter.

The molten sugar reservoir 14 is supported on a framework of angle iron members 16 raised on upright rods 18 above the movable endless conveyor belt 20. The rods 18 are secured to the supporting frame 22 for the conveyor belt 20. The walls of the reservoir 14 contain electrical heating elements (not shown) to keep the sugar molten while awaiting distribution onto the conveyor belt 20. Adjacent the bottom of reservoir 14 are a pair of adjustable valves 26 and 28 that are located in two distinct outlets (not shown) for the reservoir 14. The reservoir outlets are coupled to two conduits 30 and 32 and the valves 26 and 28 are adjustable to control the flow of molten sugar into the conduits 30 and 32, respectively. Both conduits 30 and 32 are insulated with wrappings 34 and 36 of an appropriate insulating material to prevent the molten sugar from cooling excessively as it flows through the conduits.

The conduit 30 leads to a distribution mechanism that includes a hopper 38 having a generally V-shaped cross section. The hopper 38 is oriented transversely of the endless belt 20 and is supported above the belt 20 on a pair of rods 40 and 42 mounted at their ends in brackets 44 and 46 attached to either side of the frame 22. The top of the V-shaped hopper 38 is substantially open and the end of the conduit 30 extends into the open top of the hopper to deliver molten sugar to the hopper. As with the reservoir 14, electrically operated heating elements 48 are embedded in the side walls of the hopper 38 to keep the sugar molten.

As best shown in FIG. 3, a plurality of evenly spaced apart distribution openings 50 are formed in the bottom of the hopper 38 to permit molten sugar to flow from the hopper 38 onto the moving belt 20. As illustrated, the molten sugar from the hopper 38 is dispensed in parallel, spaced apart fine strands that extend lengthwise of the belt 20. The belt 20, which is made of flexible stainless steel, presents a continuous unbroken surface to the hopper 38 and extends in a loop around two spaced apart pulleys 52 and 54. A motor 56 drives the pulley 54 to move the belt 20.

The second conduit 32 leading from the reservoir 14 extends to a second distribution mechanism that includes an electrically heated hopper 58 similar to the hopper 38. Unlike the hopper 38, however, the top of the hopper 58 is substantially closed. Only a centrally located circular opening 60 having a diameter somewhat larger than the diameter of the conduit 32 is formed in the top of the hopper 58. The hopper 58 also is not rigidly secured to the frame 22, but rather is journaled at each end in a supporting bracket 62 mounted at the end of a suitable lever system. The lever system, which will be described hereafter, permits the hopper 58 to move transversely across the belt 20 and to dispense molten sugar onto the belt through distribution openings 64 formed in the bottom of the hopper 58. The molten sugar dispensed from the hopper 58 forms a plurality of fine strands extending transversely of the moving belt 20 so that together, the longitudinally extending strands distributed by the hopper 38 and the transversely extending strands distributed by the hopper 58 form an openwork pattern having a plurality of interstices. The openwork pattern may be random and irregular or it may be regular with any particular relative orientation between the transverse strands and the longitudinal strands, depending upon the operation of the lever system.

The lever system includes a support arm 66 rigidly secured at one end to the supporting bracket 62 for the hopper 58 and rigidly secured at its other end to the top of an upright, rotatable pin 68. Intermediate its ends, the pin 68 is rotatably coupled to one end of an arm 70 that is fixed at its opposite end on a second upright, rotatable pin 72. The pin 72 is rotated by the reciprocating action of a linkage 74 that is moved by a crankshaft 76 slidably journaled in a split nut 78. The split nut 78 is eccentrically mounted on a rotatable element 80 coupled to a drive sprocket 82 driven by a chain 84 extending from the motor 56. Accordingly, as the sprocket 82 is rotated by the chain 84, the split nut 78 is moved in a circle and the crankshaft 76 executes a reciprocating movement lengthwise of the moving belt 20. The reciprocating movement of the crankshaft 76 produces a pivotal movement of the upright pin 72 and the arm 70 so that the hopper 58 moves back and forth across the width of the belt 20.

The bottom of the upright pin 68 is rigidly secured to a linkage 86 that diverges from the arm 70 and is rigidly coupled to a rotatable, upright pin 88. The upright pin 88 is pivoted by a second linkage 90 coupled at one end to the pin 88 and at its other end eccentrically mounted on a drive sprocket 92. The sprocket 92, like the sprocket 82, is driven by the chain 84 extending from the motor 56. Accordingly, as the sprocket 92 rotates, the linkage 90 pivots the upright pin 88, which causes a reciprocating movement of the linkage 86. The reciprocating movement of the linkage 86, in turn, causes the upright pin 68 to rotate so that the hopper 58 has a waving motion as it moves across the width of the belt 20.

With the lever system described above for the hopper 58, the openwork structure of the distributed molten sugar can attain any one of an essentially unlimited number of different patterns. It should also be noted that the central opening 60 in the top of the hopper 58 helps maintain the end of the conduit 32 in the hopper 58. As in the hopper 38, the walls of the hopper 58 are provided with electrically operated heating elements 93 to keep the molten sugar material in the hopper 58 in a molten state.

It will be understood that the electrical heating elements for the reservoir 14, as well as the hoppers 38 and 58, are controlled by thermostatic elements (not shown) so that their temperatures may be preset and maintained at desired levels.

After the hoppers 38 and 58 have distributed molten sugar from the reservoir 14 in an openwork pattern on the moving belt 20, the distributed sugar, which begins to harden on contact with the belt, moves against a rotating, circular knife blade 94. The blade 94 is mounted on a shaft 96 extending transversely of the belt 20 and journaled at its ends in supporting brackets 98 and 100 attached to opposite sides of the frame 22. A drive chain 102 engages a sprocket (not shown) secured to one end of the shaft 96 and a second sprocket 101 disposed below the upper run of the belt 20. The lower sprocket 101 is, in turn, driven by a chain 104 powered by the motor 56.

As best shown in FIG. 3, the rotating blade 94 is located centrally relative to the moving belt 20 so as to divide the distributed molten sugar lengthwise into two halves. Immediately downstream of the rotating blade 94 is a second blade assembly in which six blades 106 are oriented transversely of the belt 20 and are mounted so as to be circumferentially spaced apart around a shaft 108 that also extends across the belt 20. The supporting shaft 108 is journaled at its ends in the brackets 98 and 100 and is driven by a drive chain 110. The chain 110 extends from the shaft 96 to the shaft 108 so that the rotation of the shaft 108 is coordinated with the rotation of the shaft 96. The rotating blades 106 cut the two strips of distributed sugar coming from the blade 94 into a series of distinct pieces of approximately equal length, assuming a constant velocity of the belt 20.

As shown in FIG. 1A, the brackets 98 and 100 that carry the shafts 94 and 108 for the blades 94 and 106 are biased against the moving metal belt 20 by four coil springs 112. Each spring 112 encircles a mounting post 114 that supports one end of a bracket 98 or 100. The lower end of each coil spring 112 rests against an end of a bracket 98 or 100 while the upper end of each spring engages the flange of a nut threaded onto the top of the corresponding post 114. Accordingly, adjustments in the force biasing the knife blades 94 and 106 against the moving belt 20 can be made by tightening or loosening the nuts 116 on the mounting posts 114.

After the distributed sugar has been cut into pieces by the blades 94 and 106, it is carried on the belt 20 underneath a hood 118 that directs a flow of cool air onto the sugar. The cool air is provided by a conventional air cooler 120, such as an air conditioning unit, which is mounted adjacent the reservoir 14. The cool air is blown from the air cooler 120 through a conduit 122 to the hood 118. The cool air speeds up cooling of the molten sugar on the belt 20 so that the pieces of sugar core will be self-supporting and have sufficient rigidity to facilitate their transfer to a second endless belt 124.

As can be seen in FIG. 1A, the endless belt 124 has a greater flexibility than the steel belt 20 and may, for example, be a plastic coated, fabric belt. Due to its greater flexibility, the belt 124 can be brought very close to the steel belt 20 to facilitate transfer of the pieces of sugar, which form the core of the confection being manufactured. The pieces of sugar are sufficiently rigid so that they can span the short gap between the belt 20 and the belt 124 and are prevented from shifting laterally by a pair of guides 126 disposed one on each side of the belt 20 just above the surface of the belt. The endless belt 124 merely serves to transfer the pieces of sugar to a third endless belt 128. The belt 124 is driven by a chain drive 130 as a slave drive from the drive mechanism for the belt 128.

As best seen in FIG. 1B, the belt 128 is a wire mesh belt and forms part of a chocolate coating solution. The wire mesh belt 128 extends lengthwise of and above a reservoir or sump 132 that contains a coating material 134, which, in the illustrated embodiment, is molten chocolate. The belt 128 is driven by a drive chain 136 that extends from a sprocket (not shown) attached to a drive shaft 137 to an intermediate sprocket 138. The sprocket 138, in turn, is driven by a drive chain 140 powered by a motor 141 supported on a frame 142. The reservoir 132 is also supported on the frame 142 and is covered with a hood 144 for sanitary reasons. As in the various receptacles for the molten sugar, the reservoir 132 has electrically operated heating elements 146 embedded in its walls to keep the chocolate 134 molten. The chocolate is melted in a separate apparatus (not shown) that is conventionally used in the manufacturing of confections. The chocolate is melted in a batch-type operated but is supplied to the reservoir 132 at regular intervals to permit the apparatus illustrated in FIGS. 1A, 1B, and 1C to operate continuously.

The motor 140 also drives, through two drive chains 150 and 152 arranged in series, a pair of wheels 154a and 154b mounted on a shaft 156 and covered by the hood 144. The two wheels 154a and 154b are positioned near the upstream end of the chocolate coating station and each comprises an annular portion 158a, 158b secured to a central hub 160a, 160b by spokes 162a, 162b. The annular portions 158a and 158b of the two wheels 154a and 154b dip into the molten chocolate 134 in the reservoir 132 as the wheels rotate in a counterclockwise direction. Chocolate adheres to the inner sides of the wheel portions 158a and 158b and is drawn up above the level of the wire mesh belt 128 as the wheels 154a and 154b rotate. As the chocolate adhering to the wheel portions 158a and 158b begins to be carried downward with rotation of the wheels 154a and 154 b back into the reservoir 132, flexible rubber scrapers 164a and 164b remove the chocolate from the inner side surfaces of the wheel portions 158a and 158b and direct the chocolate into two troughs 166a and 166b. The molten chocolate will, of course, also adhere to the outer sides of the annular wheel portions 158a and 158b. In order that the chocolate adhering to the outer sides of the wheels 154a and 154b will not build up and tend to clog the bearings for the supporting shaft 156, two auxiliary scrapers 174a and 174b are mounted on the wall of the hood 144 to scrape the outer sides of the wheels immediately after they emerge from the reservoir 132.

The troughs 166a and 166b extend transversely of the wire mesh belt 128, each trough extending approximately half-way across the width of the belt. At their ends adjacent their respective wheels 154a and 154b, the troughs 166a and 166b mount the scrapers 164a and 164b. The troughs 166a and 166b themselves are mounted on supporting arms 168a and 168b secured to a mounting bar 170 that extends across and above the run of the belt 128. As can best be seen in FIG. 1B, each trough 166a, 166b has a distribution slot 172a, 172b in its bottom for dispensing the molten chocolate onto the pieces of sugar passing underneath the troughs on the belt 128. As illustrated in FIG. 4, the chocolate flows out of the troughs 166a and 166b in two continuous, broad streams that cover everything passing underneath the troughs.

Chocolate that falls on the belt 128 will tend to pass through the openings in the belt and fall back into the reservoir 132. Nonetheless, chocolate that falls into interstices of the pieces of sugar may, in many cases, cover over and block the interstices. In order to remove the chocolate from the interstices of the pieces of sugar, the coated sugar pieces are subjected to a blast of air at a point downstream in the run of the belt 128 from the troughs 166a and 166b. The blast of air is provided by a fan or blower 176 that has its intake located on one side of the hood 144. The exhaust of the blower 176 is covered by a metal housing or plenum chamber 178 that collects the exhausted air. A portion of the plenum chamber extends transversely of the belt 128 and a plurality of downwardly directed openings 180 in the portion of the plenum chamber 178 direct streams of air downwardly over the coated pieces of sugar passing underneath, as illustrated in FIG. 5. The streams of air tend to re-open the interstices of the distributed sugar pieces by blowing the molten chocolate downwardly through the openings in the wire mesh belt 128 into the reservoir 132. The streams of air also tend to blow the molten chocolate around the bottom surfaces of the pieces of sugar so as to produce a more uniform coating of the sugar pieces, as well as to remove excess chocolate, generally.

From the chocolate coating station, the coated pieces of sugar are transferred onto a fourth endless belt 182 for cooling. The endless belt 182 may be a plastic coated fabric belt and may have a horizontal run of as much as 30 feet. The relatively long length of the belt 182 is necessary to insure a relatively slow and controlled cooling of the coated sugar pieces for optimum appearance of the hardened chocolate. Throughout a substantial portion of its horizontal run, the belt 182 is covered by a hood 184. Cool air is introduced into each end of the hood 184 through conduits 186 and 188. Both conduits 186 and 188 lead from a conventional cooling unit 190, which may include a fan (not shown) and which is driven by its own motor (not shown). An appropriate pipe or pipes 196 couples the compressor 194 to the cooling unit 190. Although the cooling unit 190 may include a fan, the flow of air through the hood 184 must be kept relatively slow as not to speed unduly the cooling of the chocolate coating or disturb the coating when it is still relatively soft. At the end of the run of the belt 182, the now finished pieces of candy are transferred onto a table 198 which serves as a packing station. The pieces of candy are manually scooped up at the packing station and arranged in boxes for shipment and sale.

It will be understood that the embodiment described above is merely exemplary and that persons skilled in the art may make many variations and modifications without departing from the spirit and scope of the invention. In particular, the various stations of the complete apparatus might be rearranged so as to produce different types of confections. All such modifications and variations are intended to be within the scope of the invention as defined in the appended claims.

I claim:

1. A continuous process for manufacturing confections comprising:
   a. distributing a first hardenable liquid confectionary material onto a surface in an openwork pattern having a plurality of interstices;
   b. hardening said first liquid confectionary material, at least partially, in said openwork pattern;
   c. distributing a second hardenable, liquid confectionary material over the hardened distributed first material, while the distributed first material is supported on a surface, so as to coat the distributed first material;
   d. removing the distributed second material from at least some of the interstices defined by the distributed first material so as to reopen, at least partially, said at least some of the interstices, while maintaining a coating of the second material on the distributed first material; and
   e. allowing the distributed first and second materials to harden.

2. A process according to claim 1, wherein the distributed second material is removed from said at least some of the interstices by supporting the distributed first material on a mesh surface and blowing air downwardly over the distributed first and second materials toward the mesh surface.

3. A process according to claim 2, wherein the distributed first material is placed on the mesh surface prior to distributing the second material over the distributed first material.

4. A process according to claim 1, also comprising cutting the at least partially hardened first material into distinct pieces before distributing the second material over the distributed first material.

5. A continuous process for manufacturing confections comprising:
   a. distributing a molten sugar material onto a surface in an openwork pattern having a plurality of interstices;
   b. cooling the distributed sugar material so as to harden it, at least partially;
   c. placing the at least partially hardened, distributed sugar material on a mesh supporting surface;
   d. distributing a molten chocolate material over the distributed sugar material on the mesh supporting surface so as to coat the distributed sugar material;
   e. blowing air downwardly over the distributed sugar material and the distributed chocolate material toward the mesh supporting surface to remove the distributed chocolate material from and reopen, at least partially, at least some of the interstices in the distributed sugar material, while maintaining a coating of chocolate material on the distributed sugar material; and
   f. allowing the sugar material and the chocolate material to harden more completely.

6. A process according to claim 5, also comprising cutting the at least partially hardened sugar material into distinct pieces before distributing the chocolate material over the distributed sugar material.

* * * * *